United States Patent [19]

Reubke

[11] 4,435,324
[45] Mar. 6, 1984

[54] PROCESS FOR THE PREPARATION OF 1-ALKYLAMINOANTHRAQUINONES

[75] Inventor: Karl-Julius Reubke, Cologne, Fed. Rep. of Germany

[73] Assignee: Bayer Aktiengesellschaft, Leverkusen, Fed. Rep. of Germany

[21] Appl. No.: 361,692

[22] Filed: Mar. 25, 1982

[30] Foreign Application Priority Data

Apr. 16, 1981 [DE] Fed. Rep. of Germany ....... 3115548

[51] Int. Cl.³ .............................................. C07C 97/24
[52] U.S. Cl. .................................................... 260/378
[58] Field of Search ............................... 260/378, 382

[56] References Cited

U.S. PATENT DOCUMENTS

| | | | |
|---|---|---|---|
| 1,404,056 | 1/1922 | Portheim | 260/369 |
| 1,931,295 | 10/1933 | Meuly | 260/378 |
| 2,185,709 | 1/1940 | Ogilvie | 260/378 |
| 4,046,785 | 9/1977 | Hirai et al. | 260/378 |
| 4,163,947 | 8/1979 | Schroeder et al. | 260/378 |

FOREIGN PATENT DOCUMENTS

| | | | |
|---|---|---|---|
| 136777 | 11/1902 | Fed. Rep. of Germany | 260/378 |
| 144634 | 9/1903 | Fed. Rep. of Germany | 260/378 |
| 50/63017 | 5/1975 | Japan | 260/378 |

*Primary Examiner*—Natalie Trousof
*Assistant Examiner*—Raymond K. Covington
*Attorney, Agent, or Firm*—Sprung, Horn, Kramer & Woods

[57] ABSTRACT

Improved process for the preparation of 1-alkylaminoanthraquinones by aminolysis of 1-nitroanthraquinones with alkylamines at elevated temperature in water and organic water-immiscible solvents, in the presence of acid-binding agents, according to which process calcium hydroxide is used as the acid-binding agent.

8 Claims, No Drawings

PROCESS FOR THE PREPARATION OF 1-ALKYLAMINOANTHRAQUINONES

The invention relates to an improved process for the preparation of 1-alkylamino-anthraquinones by aminolysis of 1-nitroanthraquinones with alkylamines.

Processes for the preparation of 1-alkylaminoanthraquinones by aminolysis of 1-nitroanthraquinones are known (see, for example, German Patent Specification 144,634, German Patent Specification No. 136,777, Swiss Patent Specification No. 478,185, U.S. Pat. No. 4,163,747 and Japanese Published Application No. 75/63,017 reported in Chemical Abstracts Vol. 83, (1975) No. 116959 n). In these known processes, the alkylamines are used in considerable excesses in some cases, in order to achieve as complete a conversion as possible of the 1-nitroanthraquinones. Japanese Application 75/63,017 also points out the possibility of employing acid-binding agents other than the alkylamines. Alkali metal carbonates, hydroxides and acetates are mentioned.

However, all of these known processes have the serious disadvantage that they give rise to dialkylnitrosamines either in the aminolysis or during the working-up of the reaction mixtures or in the waste liquor. Since these nitrosamines have proved to be highly toxic compounds, it was the technical problem to find a process for the preparation of 1-alkylamino-anthraquinones by aminolysis of 1-nitroanthraquinones with alkylamines, which process not only gives the 1-alkylaminoanthraquinones in high yields and in the required high qualities, but in which process, in addition, nitrosamines do not occur in any process stage of the preparation.

It has now been found that 1-alkylamino-anthraquinones can be prepared in high yields and excellent purity by aminolysis of 1-nitroanthraquinones with alkylamines, without nitrosamines being formed in any stage of the preparation, if the aminolysis of the 1-nitroanthraquinones is carried out in the presence of calcium hydroxide.

The invention therefore relates to a process for the preparation of 1-alkylamino-anthraquinones by aminolysis of 1-nitroanthraquinones with alkylamines at elevated temperature in water and organic water-immiscible solvents, in the presence of acid-binding agents, which is characterised in that calcium hydroxide is used as the acid-binding agent.

The use, according to the invention, of calcium hydroxide as the acid-binding agent makes possible the following: 1. to dispense with the use of a relatively large excess of amine in the aminolysis and instead to carry out the reaction with almost stoichiometric quantities of alkylamines, and in this manner to substantially reduce the quantity of possible nitrosamine-forming agents; 2. the calcium nitrite formed from the calcium hydroxide, in contrast to the nitrites formed with other acid-binding agents, for example sodium carbonate, can, surprisingly, be converted, by boiling with ammonium salts, to nitrogen, water and calcium salts of the acids on which the ammonium salts are based, the reaction proceeding smoothly and without the formation of nitrosamines.

The calcium hydroxide is employed in quantities of from 1 to 5 equivalents per mol of 1-nitroanthraquinone.

The alkylamines are used in quantities of from 1 to 1.5 mol, preferably from 1.05 to 1.2 mol per mol of 1-nitroanthraquinone.

The decomposition of the calcium nitrite, which is formed in the aminolysis, to give nitrogen, water and calcium salts of the acids on which the ammonium salts used for the decomposition are based is advantageously carried out in such a manner that the reaction mixture present after the end of the aminolysis is warmed to the reflux temperature, after the addition of ammonium salts, until nitrite is no longer detectable in the reaction mixture.

The ammonium salts of those acids which form water-soluble salts with calcium, for example ammonium chloride, formate, acetate and benzoate, are advantageously used as the ammonium salts. The ammonium salts can also be produced in the reaction mixture by the addition of ammonia and the appropriate acids.

The ammonium salts are employed in a quantity at least equivalent to the quantity of calcium hydroxide employed; in general, from 2 to 6 equivalents of ammonium salt are employed per mol of calcium hydroxide used.

In the process according to the invention, 1-nitroanthraquinones prepared in any desired manner can be employed. However, since the purity of the 1-alkylaminoanthraquinones prepared according to the invention is essentially determined by the purity of the 1-nitroanthraquinones used, it is advisable to use 1-nitroanthraquinones which are as pure as possible. 1-Nitro-anthraquinone is preferably used as the starting material. However, it is also possible to employ substituted 1-nitro-anthraquinones, such as, for example, 1-nitro-5-hydroxyanthraquinone, 1-nitro-8-hydroxyanthraquinone, 1-nitro-5-chloroanthraquinone or 1-nitro-8-chloroanthraquinone.

Within the scope of the process according to the invention, alkylamines are understood as meaning aliphatic, cycloaliphatic and araliphatic amines. Amines having a $C_1$–$C_{18}$-alkyl radical, preferably a $C_1$–$C_6$-alkyl radical, may particularly be mentioned as aliphatic alkylamines. These alkyl radicals can optionally be substituted by halogen, hydroxyl, alkoxy, dialkylamino or cyano. The following may be mentioned as examples of such optionally substituted $C_1$–$C_{18}$-alkyl radicals: methyl, ethyl, n-propyl, iso-propyl, n-, iso- or tert.-butyl, n-, iso- or tert.-amyl, n- or iso-hexyl, n-dodecyl, $\beta$-chloroethyl, $\beta$, $\beta,\beta$-trifluoroethyl, $\beta,\gamma$-dichloropropyl, $\beta$-cyanoethyl, $\beta$-cyanoethoxyethyl, $\beta$-methoxyethyl, methoxybutyl, $\beta$-hydroxyethyl, $\beta,\gamma$-hydroxypropyl, $\beta$-diethylaminoethyl and $\gamma$-dimethylamino-propyl.

Amines having $C_5$–$C_8$-cycloalkyl radicals may particularly be mentioned as cycloaliphatic alkylamines. These cycloalkyl radicals can be substituted by $C_1$–$C_4$-alkyl, hydroxyl, $C_1$–$C_4$-alkoxy, $C_1$–$C_4$-dialkylamino, chlorine or bromine.

The benzyl, the $\beta$-phenylethyl, the $\gamma$-phenylpropyl, the $\gamma$-phenyl-$\alpha$-methyl-propyl, the $\gamma$-phenyl-$\alpha,\gamma,\gamma$-trimethylpropyl, the $\alpha$-isopropyl-$\gamma$-phenylpropyl, the $\alpha$-cyclohexyl-$\gamma$-phenylpropyl and the $\alpha$-($\beta$-phenylethyl)-$\gamma$-methylbutyl radical may be mentioned as examples of araliphatic alkyl radicals.

Those solvents the boiling points of which are above 80° C. are preferably used as the organic water-immiscible solvent. The following may be mentioned as examples of such solvents: aliphatic, cycloaliphatic and aromatic hydrocarbons, halogenohydrocarbons and aromatic hydrocarbons substituted by a nitro group. The following may be mentioned as examples of this group of substances: saturated aliphatic $C_7$–$C_{18}$-hydrocarbons and mixtures thereof, cyclohexane, perchloroethylene, benzene, toluene, xylene, methylnaphthalene, chlorobenzene, chloronaphthalene, dichlorobenzene, trichlorobenzene and also nitrobenzene and nitrotoluene.

Since preferred organic solvents have boiling points above the temperature at which the aminolysis is to be carried out, the choice of the organic solvent depends on the intended process temperatures. Toluene and xylene are preferably used as solvents.

The ratio water:organic solvent can vary within wide limits; in general, the ratio is between 1:10 and 10:1, preferably 2:1 and 8:1.

In order to prevent the amines from escaping during the reaction, the process according to the invention is carried out in a closed vessel. The starting compounds can be introduced into this reaction vessel and warmed together to the reaction temperature; however, it is also possible initially to introduce the nitroanthraquinone, the acid-binding agent and the organic solvent and to warm them to the reaction temperature, and only then to pump in the aqueous amine solution.

In general, the reaction temperature is between 80° and 120° C. The reaction temperature is advantageously chosen such that it is above the boiling point of the amine used or of the water, so that the reaction is carried out under pressures between 0.1 and 3 bars.

After the end of the aminolysis reaction, the ammonium salt, or a mixture of ammonia and the appropriate acid, is added to the reaction mixture and the latter is then heated to the reflux temperature until nitrite is no longer detectable in the solution. To accelerate the decomposition of the calcium nitrite, it is possible to further meter in, during the boiling, the acid on which the ammonium salt used is based.

The working-up of the resulting reaction mixture is advantageously effected in such a manner that the solvent is first distilled off together with water and the 1-alkylamino-anthraquinone is then separated off in the customary manner by filtration. The solvent/water mixture which has been distilled off can be re-used for the next reaction. The 1-alkylamino-anthraquinones prepared according to the invention are produced in high yield and in such excellent quality that they can directly be used as dyestuffs or can be further processed in another way.

A preferred embodiment of the process according to the invention may be illustrated with reference to the preparation of 1-methylaminoanthraquinone: 1-nitroanthraquinone, water, xylene, slaked lime and methylamine (100% strength or in the form of an aqueous solution) are heated to 95° to 110° C. in an air-tight stirred mixing vessel and stirred at this temperature for from 15 to 24 hours. During this process, the pressure decreases from initially 1-2.5 bars to 0.5-1.5 bars. After the end of the aminolysis, the reaction mixture is allowed to cool slightly, ammonium chloride, or a mixture of equivalent quantities of acetic acid and aqueous ammonia solution, is added and the mixture is heated under reflux until a sample of the mixture no longer gives a reaction for nitrite (duration: 3 to 8 hours). The xylene is then distilled off together with water, if appropriate after acidification with hydrochloric acid, a quantity of water corresponding to the amount of water distilled off advantageously being added to the reaction mixture. However, the distillation can also be effected by passing steam into the mixture. When all the xylene has been distilled off, the 1-methylamino-anthraquinone is filtered off under suction and washed with water.

1-Alkylamino-anthraquinones, for example 1-methylamino-anthraquinone and 1-isopropyl-anthraquinone, are important dyestuffs for bulk-dyeing of plastics (1-methylaminoanthraquinone is listed as Disperse Red 9 or as Solvent Red 111 under the formula No. 60505 in the Colour Index). Alkylaminoanthraquinones are also used as intermediate products for the preparation of acid dyestuffs (see Ullmanns Enzyklopädie der technischen Chemie (Ullmanns Encyclopaedia of Industrial Chemistry), 4th Edition, Volume 7, page 641).

EXAMPLE 1

25.2 l of water, 6.85 l of xylene, 6.85 kg (=27 mol) of 1-nitroanthraquinone and 1.99 kg (=27 mol) of calcium hydroxide (Ca(OH)$_2$) and 3.0 kg (=29 mol) of aqueous 30% strength methylamine solution are heated to 105° C. in a vessel of 150 l capacity, after the vessel has been closed. During this process, the pressure increases to 1.5 to 2.0 bars. In the course of the reaction time of 20 hours, the pressure decreases again to 1.1 to 1.3 bar. The mixture is then allowed to cool to about 80° C. and 6.85 kg (=128 mol) of ammonium chloride are added. The reaction mixture is heated to the reflux temperature and concentrated hydrochloric acid is simultaneously allowed to run in through the reflux condenser. During this process, the pH value of the reaction mixture slowly decreases from initially 7 to 8 (after the addition of ammonium chloride) to 4 to 5. The evolution of nitrogen begins very gradually. The dropwise addition of hydrochloric acid during the first boiling phase prevents the escape of too much ammonia. The addition of acid is ended as soon as a fairly vigorous evolution of gas is established. The evolution of gas (evolution of nitrogen) has ended after 5 hours. The mixture is further boiled for 3 hours and xylene and water are then distilled off. In order to prevent the suspension from becoming too concentrated during the distillation, the water which has been distilled off is replaced by fresh water. The water/xylene mixture which has been distilled off is re-used for the next batch.

The 1-methylamino-anthraquinone is then filtered off under suction at 80° C. and washed with 100 l of hot water. After the product has been dried at 80° C., 6.3 kg of 1-methylamino-anthraquinone (97 to 98% strength) are obtained, corresponding to a yield of from 96 to 97% of theory.

In no phase of the preparation process are nitrosamines detectable, within the limit of detection of 1 ppm.

EXAMPLE 2

60 g (=0,24 mol) of 1-nitroanthraquinone, 60 ml of xylene, 220 ml of water, 22.5 g (=0,30 mol) of calcium hydroxide and 30 ml (=0,28 mol) of 70% strength aqueous isopropylamine solution are introduced into a stirred autoclave of 0,7 l capacity. The autoclave is closed so that it is air tight and is heated to 115° C. for 30 hours. During this process the pressure falls from initially 2.9 to 1.6 bars. The autoclave is allowed to cool, the reaction mixture is transferred to a reaction flask, 80 g (=1,5 mol) of ammonium chloride are added and the calcium nitrite is boiled up (about 12 to 15 hours are required for this purpose). After the xylene/water mixture has been distilled off, the 1-isopropylaminoanthraquinone is filtered off, washed with water and dried.

Yield: 63 g of 1-isopropylamino-anthraquinone (96 to 97% strength), corresponding to a yield of from 96 to 97% of theory.

In no stage of the preparation process are nitrosamines detectable within the limit of detection of 1 ppm.

What is claimed is:

1. In the process for the preparation of 1-alkylaminoanthraquinones, wherein 1-nitroanthraquinones are aminolysed with alkylamines at elevated temperature in water and organic water-immiscible solvents, in the presence of acid-binding agents, the improvement comprising using calcium hydroxide as the acid-binding agent.

2. The process of claim 1, wherein the calcium hydroxide is employed in quantities of from 1 to 5 equivalents per mol of 1-nitroanthraquinone.

3. The process of claim 1, wherein the alkylamines are used in quantities of from 1 to 1.5 mol per mol of 1-nitroanthraquinone.

4. The process of claim 1, wherein the alkylamines are used in quantities of from 1.05 to 1.2 mol per mol of 1-nitroanthraquinone.

5. The process of claim 1, wherein the reaction mixture produced after the end of the aminolysis is heated to the reflux temperature with ammonium salts until nitrite is no longer detectable in the reaction mixture.

6. The process of claim 5, wherein as the ammonium salts are used salts of those acids which form water-soluble salts with calcium.

7. The process of claim 5, wherein the ammonium salts are employed in quantities which are at least equivalent to the quantity of calcium hydroxide used.

8. The process of claim 5, wherein from 2 to 6 equivalents of ammonium salts are employed per mol of calcium hydroxide used.

* * * * *